Jan. 22, 1963  P. R. GREEN  3,074,116
METHOD FOR MAKING COMBINED PLASTIC AND METALLIC STRUCTURES
Filed Sept. 11, 1958

Inventor:
Philip Richard Green
By
Stevens, Davis, Miller & Mosher
Attorneys

United States Patent Office 3,074,116
Patented Jan. 22, 1963

3,074,116
METHOD FOR MAKING COMBINED PLASTIC AND METALLIC STRUCTURES
Philip Richard Green, Luton, England, assignor to The English Electric Company Limited, London, England, a British company
Filed Sept. 11, 1958, Ser. No. 760,434
Claims priority, application Great Britain Sept. 20, 1957
6 Claims. (Cl. 18—59)

In the manufacture of radar aerials or reflectors and the like it is sometimes desirable to provide at or near a concave surface of a plastic support a conducting pattern in the form of a number of conductors each in a single plane. In a particular application, all the planes are parallel and in the past it has been proposed to produce such a structure by providing a convex mould having suitable grooves in its surface in which wires are laid before forming the structure in plastic material, for example by "laying up" or by some other moulding process.

According to the invention a plastic structure having a concave surface at or near which is provided at least one conductor in a single plane, is produced by applying to a convex mould a settable substance having a limited period of tackiness during its setting cycle, during said period causing relative straight-line motion towards each other of said mould and a tensioned wire or strip which is to form said conductor so as to wrap said wire or strip over said mould, completing the structure with plastic material which will unite with said settable substance, and removing the structure from said mould. It may be convenient to maintain tension on the wire throughout the remainder of the period of tackiness, but providing the plastic material which is used does not render the settable substance less tacky when it is applied, it may be applied immediately after the wire has been put in position.

Where a plurality of conductors is required each in one of a number of parallel planes, the wires may be conveniently arranged on a frame and all of them brought into contact with the prepared mould more or less simultaneously. Opposed edges of the frame may be provided with comb-like jigs to ensure accurate spacing of the wires, the teeth of the jigs being preferably directed towards the mould while tension is applied to the ends of the wires in a direction somewhat away from the mould.

Once the settable material has set sufficiently, the tension may be removed from the wires and the structure completed by "laying up," for example with a setting resin and glass cloth or by any other appropriate moulding procedure. If desired, glass cloth or other suitable reinforcement may be included in the initial layer of settable substance and the thickness of this layer may be varied to determine the depth of the conductors below the concave surface of the structure.

Figure 1:
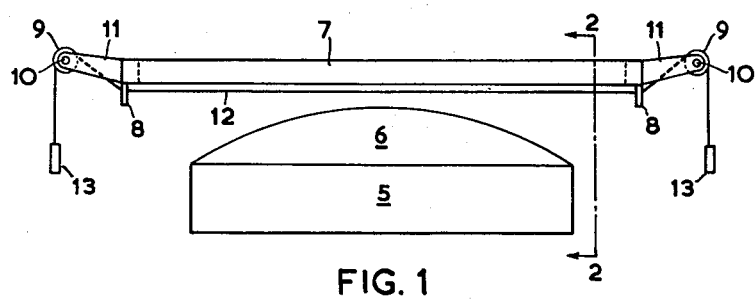
Figure 2:
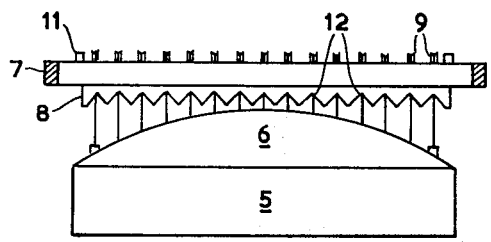
Figure 3:
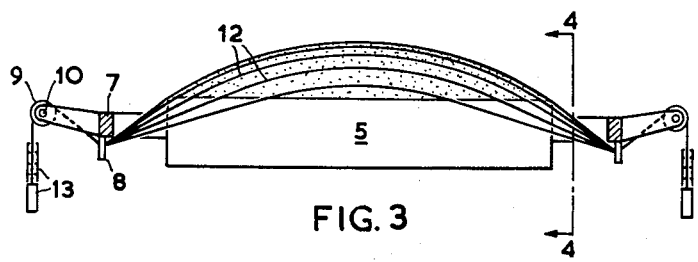
Figure 4:
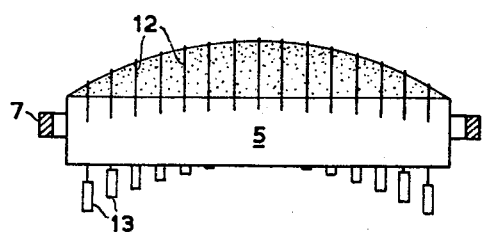

One method of carrying out the invention will now be described with reference to the accompanying drawings in which FIG. 1 is an elevation of apparatus used, with parts in their preparatory positions, FIG. 2 is a view in the direction 2—2 of FIG. 1, FIG. 3 is a view similar to FIG. 1 with the parts in their co-operative positions, and FIG. 4 is a view in the direction 4—4 of FIG. 2.

Referring first to FIGS. 1 and 2, a mould 5 having an upper surface 6 of convex form corresponding to the concave shape of the structure, for example a radar aerial, it is desired to produce is coated with a settable material having a tacky or, in other words, a pressure sensitive surface, for a limited period during its setting cycle, the surface 6 having previously been waxed to facilitate removal of the structure after the moulding operation is completed. The settable material may be, for example, a material known under the trade mark "Shell Epikote 815" and a layer of glass cloth may be incorporated in this initial coating. A frame 7 is arranged above the mould 5 and is provided on two of its opposite edges with a comb-like jig 8 having teeth between which wires to be incorporated in the moulded structure can be located. A corresponding number of pulleys 9 is arranged on a shaft 10 supported adjacent each of the two edges of the frame by brackets 11.

Wires or conductors 12 of suitable cross sectional area and shape which it is desired to incorporate in the moulded structure are stretched across the underside of the frame 7, are held in predetermined parallel spaced relationship by means of the indentations of the jigs 8, are passed over the pulleys 9 and are held in tension by weights 13 hanging from each end of each of the respective wires the weights 13 permitting relative endwise displacement of the wires while maintaining them stationary under constant tension.

While the initial layer is still tacky, relative motion towards each other is given to the frame 7 and the mould 5 either by raising the mould or by lowering the frame so that the wires are maintained in planes having the required spacing while lengthways movement of the wires is permitted by motion of the weights 13 relative to the frame 7. This is shown in FIGS. 3 and 4. The prepared tacky surface accepts the wires by impression therein but due to the nature of the surface does not allow side slip. The mould 5 and the frame 7 are held in the position shown in FIGS. 3 and 4 until the surface sets. The moulded structure is then completed by adding or "laying up" further layers of glass cloth and resin which may be the same resin as was used for the initial layer, or may be a different resin which will unite with it.

It will be obvious that modifications of the method can be used, for example where a net-like pattern is required, two sets of wires crossing each other at any desired angle could be arranged by suitable modification of the frame 7.

What I claim as my invention and desire to secure by Letters Patent is:

1. A method of making a concave radar aerial member or the like comprising, coating the outer convex surface of a mould with a settable plastic substance in a tacky condition, arranging a flat frame member in juxtaposition to the convex surface of the mould, said frame member having a plurality of spaced flexible electrical conductors in stretched condition yieldably secured against the side of said frame member facing said convex mould surface, initiating relative movement towards each other of said convex mould surface and frame member to a position wherein the electrical conductors are pressed into the tacky surface and assume the shape of said convex mould surface, and holding said conductors in said position until said tacky settable plastic substance sets.

2. A method as defined in claim 1 wherein a layer of a reinforced settable plastic material is applied to said settable plastic substance containing said electrical conductors imbedded therein, and removing the composite member from the convex mould after the reinforced settable plastic material has united with said settable plastic substance.

3. A method as defined in claim 1 wherein the ends of the spaced electrical conductors are first positioned over pulleys on opposite sides of said flat frame member, and maintaining said electrical conductors under tension by applying weights to the ends thereof.

4. A method as defined in claim 3, including the step of guiding said spaced conductors through coplanar positioning means on opposite edges of the flat frame member adjacent the pulleys to effect equal spacing of said spaced conductors.

5. A method as defined in claim 1 wherein the settable plastic substance is an epoxy resin.

6. A method as defined in claim 2 wherein the additional layer includes glass cloth as the reinforcement and an epoxy resin as the tacky settable plastic material.

References Cited in the file of this patent

UNITED STATES PATENTS

| | | |
|---|---|---|
| 2,189,006 | Hutchinson | Feb. 6, 1940 |
| 2,222,742 | Ducret | Nov. 26, 1940 |
| 2,434,379 | Weisner et al. | Jan. 13, 1948 |
| 2,470,509 | Marini | May 17, 1949 |
| 2,745,164 | Ros | May 15, 1956 |
| 2,827,414 | Bussard et al. | Mar. 18, 1958 |
| 2,928,138 | Boggs | Mar. 15, 1960 |
| 2,949,667 | Cameron et al. | Aug. 23, 1960 |